Patented Mar. 29, 1927.

1,622,271

UNITED STATES PATENT OFFICE.

LUDWIG BENDA, OF MAINKUR, NEAR FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

ACYLAMINO-HYDROXYBENZENE ARSINE OXIDES.

No Drawing. Application filed June 19, 1925, Serial No. 38,329, and in Germany July 3, 1924.

I have found that acylized aminohydroxybenzene arsonic acids can be transformed into the respective arsonious acids, or their anhydrides that is to say, the hydrates of arsine oxides and the arsine oxides themselves, without saponification taking place

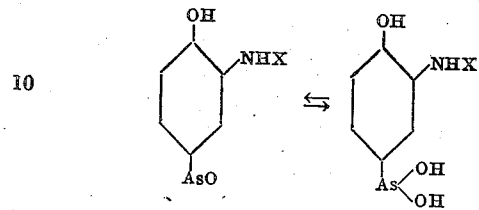

In contrast to the arsine oxides hitherto known, the new compounds possess surprisingly valuable therapeutic and prophylactic properties in the case of infection by spirochætæ.

*Example 1.*—4-acetylamino-3-hydroxybenzene-1-arsine oxide of the formula:

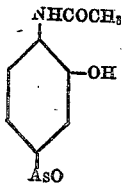

To a solution of 500 gr. acetylamino-3-hydroxybenzenearsonic acid, 100 gr. sodium iodide, 3000 cc. normal caustic soda solution and 19 litres water, 22 litres hydrochloric acid ten times normal are added. At 25–30° sulfurous acid is passed into this brown colored solution until the lemon-yellow sediment formed is not added to any longer. This precipitate is decanted by suction, washed with dilute hydrochloric acid and dissolved in five litres water; after a while the new product is precipitated as a white powder. The latter is decanted by suction and washed with water. It is hardly soluble in water, dissolves only gradually in a sodium carbonate solution double normal (in contrast to the parent material), is sparingly soluble in dilute sodium acetate solution, readily soluble in dilute alkalies, also in hot normal hydrochloric acid; by an addition to the latter solution of an excess of concentrated hydrochloric acid a white precipitate is formed.

*Example 2.*—3-acetylamino-4-hydroxybenzene-1-arsine oxide.

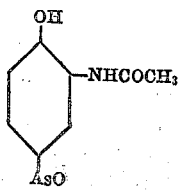

by substituting the 3-acetylamino-4-hydroxybenzene-1-arsonic acid for the 4-acetylamino-3-hydroxybenzene-1-arsonic acid of Example 1, a white powder is obtained which dissolves somewhat more readily in water than the product of Example 1 and also dissolves somewhat more readily in dilute sodium carbonate solution, but in other respects behaves very similar to the isomeric.

*Example 3.*—3-chloro-4-hydroxy-5-acetylaminobenzene-1-arsine oxide.

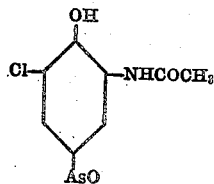

To a solution of 250 gr. 3-chloro-4-hydroxy-5-acetylaminobenzene-1-arsonic acid, 150 gr. sodium acetate and 250 gr. sodium iodide in 3000 cc. water, 600 gr. concentrated hydrochloric acid are added, while severely cooling from outside, an sulfurous acid passed in in a gradual stream until the yellow precipitate which has formed is not added to any longer. This is decanted by suction, washed with dilute hydrochloric acid and the yellow product of reaction ground together with 3000 cc. water until the color has turned to white. It is then neutralized with sodium acetate and decanted by suction. After washing with water the compound is obtained as a slightly yellow crystalline powder. It is sparingly soluble in water, dilute sodium acetate solution (in contrast to the parent material), soluble in hot normal hydrochloric acid, readily soluble in methyl and ethyl alcohol, sparingly so in ether, acetone and chloroform.

*Example 4.*—3-methyl-4-hydroxy-5-acetyl-aminobenzene-1-arsine oxide.

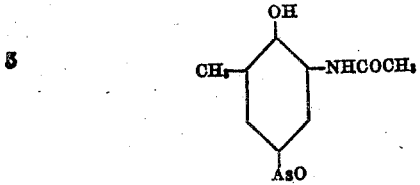

500 gr. 3-methyl-4-hydroxy-5-acetylamino-benzene-1-arsonic acid to be obtained from 4-amino-2-acetylamino-6-methyl-1-phenol by substituting for the amino group the arsonic acid group by a diazotization reaction 1000 cc. sodium carbonate solution double normal and 250 gr. sodium iodide are dissolved cold, then adding 2000 gr. ice and 600 gr. concentrated hydrochloric acid into which sulfurous acid is passed in a gradual stream while well cooling from the outside (temperature not to exceed 10°). The lemon-yellow precipitate formed is decanted by suction and treated with water and acetate as in the previous example. The new compound is of a yellow color and in contact with solvents behaves like the compound of Example 3.

Having now particularly described and ascertained the nature of my said invention and in what manner the same is to be performed, I declare, that what I claim is:

1. A process for the production of acyl-amino-hydroxybenzene arsine oxides by reducing acylamino-hydroxybenzene arsonic acids with sulfurous acid in a strongly mineral acid solution in the presence of a catalyzer.

2. As new substances acylamino-hydroxybenzene-arsine oxides, being white powders dissolving hardly in water, gradually in dilute alkalies and sparingly in dilute sodium acetate solution.

3. As new substances acylamino-hydroxybenzene-arsine oxides, the constitution of which corresponds to the formula

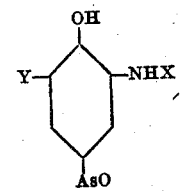

where X=acyl
Y=halogen or methyl,
being white powders dissolving hardly in water, gradually in dilute alkalies.

4. As new substance 5-chloro-4-hydroxy-3-acetylaminobenzene-arsine oxide of the formula

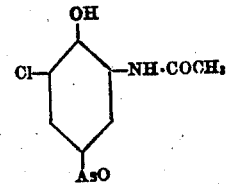

being a white powder dissolving hardly in water, gradually in dilute alkalies.

In witness whereof I have hereunto signed my name this fourth day of June 1925.

LUDWIG BENDA.